United States Patent
Liao et al.

(10) Patent No.: US 12,477,515 B2
(45) Date of Patent: Nov. 18, 2025

(54) DOWNLINK CONTROL INFORMATION-BASED PAGING EARLY INDICATOR

(71) Applicant: MediaTek INC., Hsin-Chu (TW)

(72) Inventors: Yi-Ju Liao, Hsin-Chu (TW);
Chi-Hsuan Hsieh, Hsin-Chu (TW);
Wei-De Wu, Hsin-Chu (TW);
Li-Chuan Tseng, Hsin-Chu (TW)

(73) Assignee: MediaTek Inc., Hsinchu (TW)

( * ) Notice: Subject to any disclaimer, the term of this patent is extended or adjusted under 35 U.S.C. 154(b) by 398 days.

(21) Appl. No.: 18/091,845

(22) Filed: Dec. 30, 2022

(65) Prior Publication Data

US 2023/0146553 A1     May 11, 2023

Related U.S. Application Data (63) Continuation of application No. PCT/CN2021/005158, filed on Jul. 8, 2021.

(60) Provisional application No. 63/049,189, filed on Jul. 8, 2020.

(51) Int. Cl.
*H04W 68/02*     (2009.01)
*H04W 4/90*      (2018.01)
*H04W 24/08*     (2009.01)
*H04W 72/23*     (2023.01)

(52) U.S. Cl.
CPC ............ *H04W 68/02* (2013.01); *H04W 4/90* (2018.02); *H04W 24/08* (2013.01); *H04W 72/23* (2023.01)

(58) Field of Classification Search
CPC ..... H04W 68/02; H04W 68/025; H04W 4/90; H04W 24/08; H04W 72/23; H04W 48/12; Y02D 30/70
See application file for complete search history.

(56) References Cited

U.S. PATENT DOCUMENTS

| 2012/0122495 A1 | 5/2012 | Weng et al. |
| 2022/0394663 A1 | 12/2022 | Liu |
| 2023/0108646 A1* | 4/2023 | Tseng ................. H04W 68/025 455/458 |

(Continued)

FOREIGN PATENT DOCUMENTS

| CN | 110945928 A | 11/2019 |
| WO | WO2020030738 A1 | 8/2018 |
| WO | WO2020032751 A1 | 5/2019 |

OTHER PUBLICATIONS

European Intellectual Property Office Action 21838600.1-1215, dated Jul. 12, 2024.

(Continued)

*Primary Examiner* — Farid Seyedvosoghi
(74) *Attorney, Agent, or Firm* — Helen Mao; Zheng Jin; Imperium Patent Works (57) ABSTRACT

A method of introducing a Downlink Control Information (DCI)-based early paging indication (PEI) for power consumption enhancements in a 5G/NR network is proposed. In particular, a Base Station (BS) can transmit a message including a PEI to a User Equipment (UE) when the UE is under an idle ode. Then, the UE can receive the PEI under the idle mode and determine whether to monitor a Paging Occasion (PO) according to the PEI. In some embodiments, a format of the message including the PEI can include a format of DCI.

11 Claims, 7 Drawing Sheets

(56) References Cited

U.S. PATENT DOCUMENTS

2023/0209464 A1\* 6/2023 Tsai .................. H04W 52/0216
370/311

OTHER PUBLICATIONS

Samsung: "Corrections on UE Power Savings".
3GPP; . . . ; Multiplexing and Channel Coding (Release 16).
International Search Report and Written Opinion of International Search Authority for PCT/CN2021/105158, dated Oct. 11, 2021 (9 pages).
R2-2007190, MediaTek Inc., "Paging Enhancements for UE Power Saving in NR", 3GPP TSG-RAN WG2 Meeting #111 electronic, dated Aug. 17-28, 2020 (8 pages).

\* cited by examiner

┌─────────────────────────────────────┐
│ PEI(S) FOR ONE OR MORE UE(S)        │
│ 401b                                │
├─────────────────────────────────────┤
│ INDICATING AVAILABILITY OF RS SET(S)│
│ 402b                                │
├─────────────────────────────────────┤
│ WUS AND SDI                         │
│ 403b                                │
├─────────────────────────────────────┤
│ WUS AND SDI                         │
│ 403b                                │
├─────────────────────────────────────┤
│               ⋮                     │
├─────────────────────────────────────┤
│ WUS AND SDI                         │
│ 403b                                │
├─────────────────────────────────────┤
│ WUS AND SDI                         │
│ 403b                                │
└─────────────────────────────────────┘

DOWNLINK CONTROL INFORMATION-BASED PAGING EARLY INDICATOR

CROSS REFERENCE TO RELATED APPLICATION

This application is filed under 35 U.S.C. § 111 (a) and is based on and hereby claims priority under 35 U.S.C. § 120 and § 365 (c) from International Application No. PCT/CN2021/105158, with an international filing date of Jul. 8, 2021, which in turn claims priority from U.S. Provisional Application No. 63/049,189, entitled "DCI-based Paging Early Indicator in NR Idle Mode," filed on Jul. 8, 2020. This application is a continuation of International Application No. PCT/CN2021/105158, which claims priority from US provisional applications 63/049,189. International Application No. PCT/CN2021/105158 is pending as of the filing date of this application, and the United States is a designated state in International Application No. PCT/CN2021/105158. The disclosure of each of the foregoing documents is incorporated herein by reference. the subject matter of which is incorporated herein by reference.

TECHNICAL FIELD

The disclosed embodiments relate generally to wireless communication systems, and, more particularly, to downlink control information-based early paging indication in 5G New Radio (NR).

BACKGROUND

Third generation partnership project (3GPP) and 5G New Radio (NR) mobile telecommunication systems provide high data rate, lower latency and improved system performances. In 3GPP NR, 5G terrestrial New Radio (NR) access network includes a plurality of base stations (BSs), e.g., Next Generation Node-Bs (gNBs), communicating with a plurality of mobile stations referred as user equipment (UEs). Orthogonal Frequency Division Multiple Access (OFDMA) has been selected for NR downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition. In LTE and NR networks, Physical Downlink Control Channel (PDCCH) is used for downlink scheduling. Physical Downlink Shared Channel (PDSCH) is used for downlink data. Similarly, Physical Uplink Control Channel (PUCCH) is used for carrying uplink control information. Physical Uplink Shared Channel (PUSCH) is used for uplink data. In addition, physical random-access channel (PRACH) is used for non-contention-based RACH.

One important use of broadcast information in any cellular systems is to set up channels for communication between the UE and the gNB. This is generally referred to as paging. Paging is a procedure the wireless network uses to find out the location of a UE, before the actual connection establishment. Paging is used to alert the UE of an incoming session (call). In most cases, the paging process happens while UE is in radio resource control (RRC) idle mode. This means that UE has to monitor whether the networking is sending any paging message to it and it has to spend some energy/power to run this "monitoring" process. During idle mode, a UE gets into and stays in a sleep mode or a power saving mode defined a in discontinuous reception (DRX) cycle. UE periodically wakes up and monitors PDCCH to check for the presence of a paging message. If the PDCCH indicates that a paging message is transmitted in a subframe, then the UE demodulates the paging channel to see if the paging message is directed to it.

In NR, paging reception consumes less than 2.5% of the total power. However, due to synchronization signal block (SSB) transmission scheme in NR, LOOP operations (including automatic gain control (AGC), frequency tracking loop (FTL), and time tracking loop (TTL)) and measurements (MEAS) can only be performed in certain occasions. As a result, the gap between the SSBs for LOOP/MEAS and paging occasion (PO) is longer, and UE may enter into a light sleep mode in the gap. If there is an indication before paging and UE monitors PO only if paging is indicated, then UE can save power consumption not only for paging reception, but also for the light sleep between the last SSB and PO gap. Therefore, an early paging indication (PEI) before paging may be introduced to enable more UE power saving with indication before paging. However, specific details of the PEI have not been discussed yet and there are still some issues that need to be solved.

SUMMARY

A method of introducing a Downlink Control Information (DCI)-based early paging indication (PEI) for power consumption enhancements in a 5G/NR network is proposed. In particular, a Base Station (BS) can transmit a PEI message including a PEI to a User Equipment (UE) when the UE is under an idle mode. Then, the UE can receive the PEI message under the idle mode and determine whether to monitor a Physical Downlink Control Channel (PDCCH) scrambled with Paging-Radio Network Temporary Identifier (P-RNTI) at a Paging Occasion (PO) according to the PEI. In one embodiment, a format of the PEI message including the PEI can include a format of DCI.

In one embodiment, a UE receives a PEI message from a BS when the UE is under an idle mode. The PEI message includes a PEI. A format of the PEI message includes a DCI format. The UE determines whether to monitor a PDCCH scrambled with P-RNTI at a PO according to the PEI.

In another embodiment, a BS transmits a PEI message to a UE when the UE is under an idle mode. The PEI message includes a PEI so that the UE can determine whether to monitor a PDCCH scrambled with P-RNTI at a PO according to the PEI. A format of the PEI message includes a DCI format.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
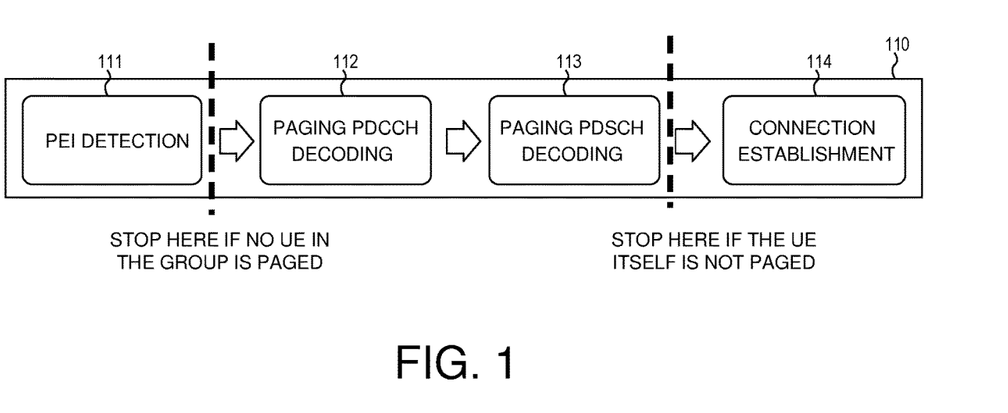
FIG. 1 illustrates a procedure of paging reception with paging early indication (PEI) in a 5G New Radio (NR) network in accordance with one novel aspect of the present invention.

FIG. 1 illustrates a procedure 100 of paging reception with paging early indication (PEI) in a 5G New Radio (NR) network in accordance with one novel aspect. In 3GPP NR, 5G NR access network includes a plurality of base stations (BSs), e.g., Next Generation Node-Bs (gNBs), communicating with a plurality of mobile stations referred as user equipment (UEs). Orthogonal Frequency Division Multiple Access (OFDMA) has been selected for NR downlink (DL) radio access scheme due to its robustness to multipath fading, higher spectral efficiency, and bandwidth scalability. In both LTE and NR networks, Physical Downlink Control Channel (PDCCH) is used for downlink scheduling. Physical Downlink Shared Channel (PDSCH) is used for downlink data. Similarly, Physical Uplink Control Channel (PUCCH) is used for carrying uplink control information. Physical Uplink Shared Channel (PUSCH) is used for uplink data. In addition, physical random-access channel (PRACH) is used for non-contention-based RACH.

One important use of broadcast information in any cellular systems is to set up channels for communication between the UE and the gNB. This is generally referred to as paging. Paging is a procedure the wireless network uses to find out the location of a UE, before the actual connection establishment. Paging is used to alert/indicate the UE of an incoming session (call). In most cases, the paging process happens while the UE is in radio resource control (RRC) idle mode. This means that the UE has to monitor whether the networking is sending any paging message to it and it has to spend some energy to run this "monitoring" process. During RRC idle mode, a UE gets into and stays in a sleep mode defined in discontinuous reception (DRX) cycle. The UE periodically wakes up and monitors PDCCH to check for the presence of a paging message. If the PDCCH indicates that a paging message is transmitted in a subframe, then the UE demodulates the paging channel to see if the paging message is directed to it.

In NR, paging reception consumes less than 2.5% of the total power. However, due to synchronization signal block (SSB) transmission scheme in NR, LOOP operations (including AGC, FTL, and TTL) and measurements (MEAS) can only be performed in certain occasions. As a result, there is some gap between the SSBs for LOOP/MEAS and paging occasion (PO), and the UE may enter light sleep mode in the gap. If there is an indication before paging and the UE monitors PO only if paging is indicated, then the UE can save power consumption not only for paging reception, but also for the light sleep between the last SSB and PO gap. Note that in light sleep mode, the UE does not fully turn off its receiver, and thus the power consumption is higher than that in deep sleep mode, but lower than normal mode. Compared to deep sleep mode, light sleep mode requires less transition power to/from normal mode.

In accordance with one novel aspect, an indication before paging, e.g., paging early indicator (PEI), is introduced to provide power saving for paging reception. In the example of FIG. 1, a diagram 110 depicts a paging reception procedure with PEI. Note that a group of UEs can be associated with the same PO. During the paging reception procedure 110 with PEI, the UE periodically wakes up and checks for PEI first (111), if no UE in the UE group is paged, then the UE stops and goes to deep sleep. Otherwise, the UE performs paging PDCCH decoding (112) as well as paging PDSCH decoding (113). If the UE itself is not paged, then the UE stops and goes to sleep. Otherwise, the UE performs connection establishment (114).

Under the paging reception procedure 110 with PEI, the UE can skip PO monitoring if PEI indicates negative/no paging in step 111. The main receiver of the UE is turned on in every paging cycle, for LOOP, MEAS, and PEI reception. If PEI indicates no paging, then after performing required measurements, the UE can turn off its main receiver and go to deep sleep until the next PEI. Note that the UE is required to perform intra-frequency or inter-frequency measurements when the serving cell is below certain threshold. Usually, the UE performs the required measurements when it wakes up for paging monitoring (i.e., every paging cycle), then the UE will stay in deep sleep until next PEI. Since PEIs are transmitted and are located near SSB bursts, power saving can be achieved not only for PO monitoring but also for light sleep between the last SSB/PEI and the PO monitoring gap and state transitions (e.g., the power mode transition from/to normal mode to/from light sleep mode), when no UE in the UE group is paged.

In accordance with another novel aspect, the physical layer design of PEI may be downlink control information (DCI)-based. In particular, PEI is included in a PEI message, and a format of the PEI message includes one of DCI formats. The BS transmits the PEI message to the UE. After receiving the PEI message, the UE determines whether to monitor a Physical Downlink Control Channel (PDCCH) scrambled with Paging-Radio Network Temporary Identifier (P-RNTI) at a PO according to PEI included in the PEI message.

Figure 2:
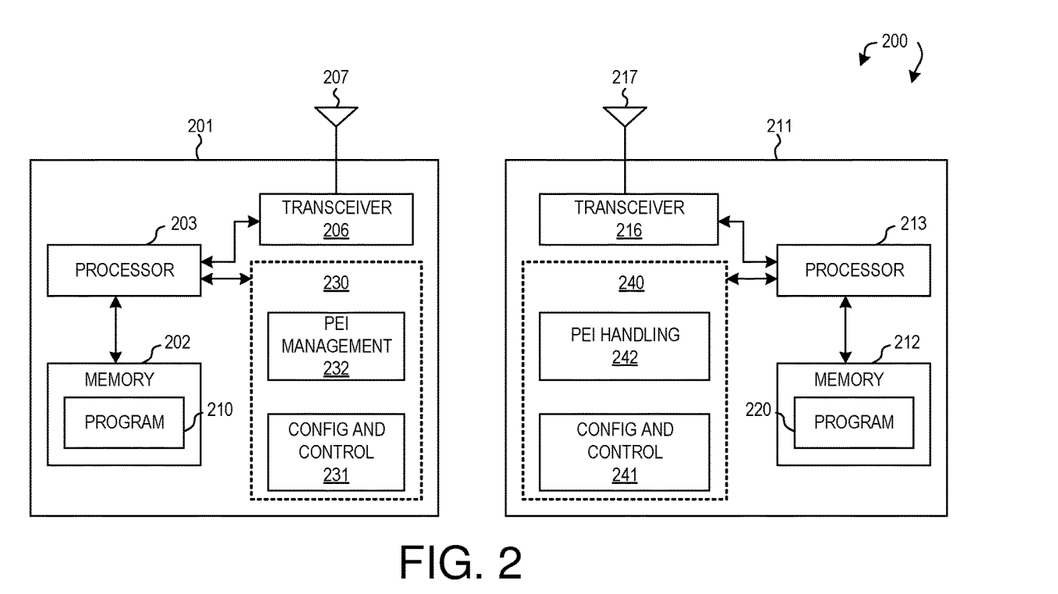
FIG. 2 is a simplified block diagram of a UE and a base station in accordance with various embodiments of the present invention.

FIG. 2 is a simplified block diagram of wireless devices 201 and 211 in accordance with embodiments of the present invention. For wireless device 201 (e.g., a BS), an antenna 207 transmits and receives radio signal. A radio frequency (RF) transceiver module 206, coupled with the antenna, receives RF signals from the antenna, converts them to baseband signals and sends them to processor 203. RF transceiver 206 also converts received baseband signals from the processor 203, converts them to RF signals, and sends out to antenna 207. Processor 203 processes the received baseband signals and invokes different functional modules and circuits to perform features in wireless device 201. Memory 202 stores program instructions and data 210 to control the operations of device 201.

Similarly, for wireless device 211 (e.g., a UE), antenna 217 transmits and receives RF signals. RF transceiver module 216, coupled with the antenna, receives RF signals from the antenna, converts them to baseband signals and sends them to processor 213. The RF transceiver 216 also converts received baseband signals from the processor 213, converts them to RF signals, and sends out to antenna 217. Processor 213 processes the received baseband signals and invokes different functional modules and circuits to perform features in wireless device 211. Memory 212 stores program instructions and data 220 to control the operations of wireless device 211.

The wireless devices 201 and 211 also include several functional modules and circuits that can be implemented and configured to perform embodiments of the present invention. In the example of FIG. 2, wireless device 201 is a BS that includes a set of control functional modules and circuit 230. Paging and PEI management circuit 232 performs paging and PEI management (e.g., management of a PEI and a paging associated with the PEI). Configuration and control circuit 231 provides different parameters to configure and control UE. Wireless device 211 is a UE that includes a set of control functional modules and circuit 240. Paging and PEI handling circuit 242 performs paging and PEI handling (e.g., handling a PEI and a determination of whether to monitor a PDCCH scrambled with P-RNTI at a PO according to the PEI). Configuration and control circuit 241 handles configuration and control parameters from the network.

Note that a wireless device may be both a transmitting device and a receiving device. The different functional modules and circuits can be implemented and configured by software, firmware, hardware, and any combination thereof. The function modules and circuits, when executed by processors 203 and 213 (e.g., via executing program codes 210 and 220), allow BS 201 and UE 211 to perform embodiments of the present invention.

In one novel aspect, BS 201 determines a PEI. The PEI is used for UE 211 under an idle mode to determine whether to monitor a PDCCH scrambled with P-RNTI at a PO. BS 201 transmits a PEI message including the PEI to UE 211. A format of the PEI message includes a DCI format. UE 211 receives the message including the PEI from BS 201. UE 211 determines whether to monitor a PDCCH scrambled with P-RNTI at a PO according to the PEI.

Figure 3:
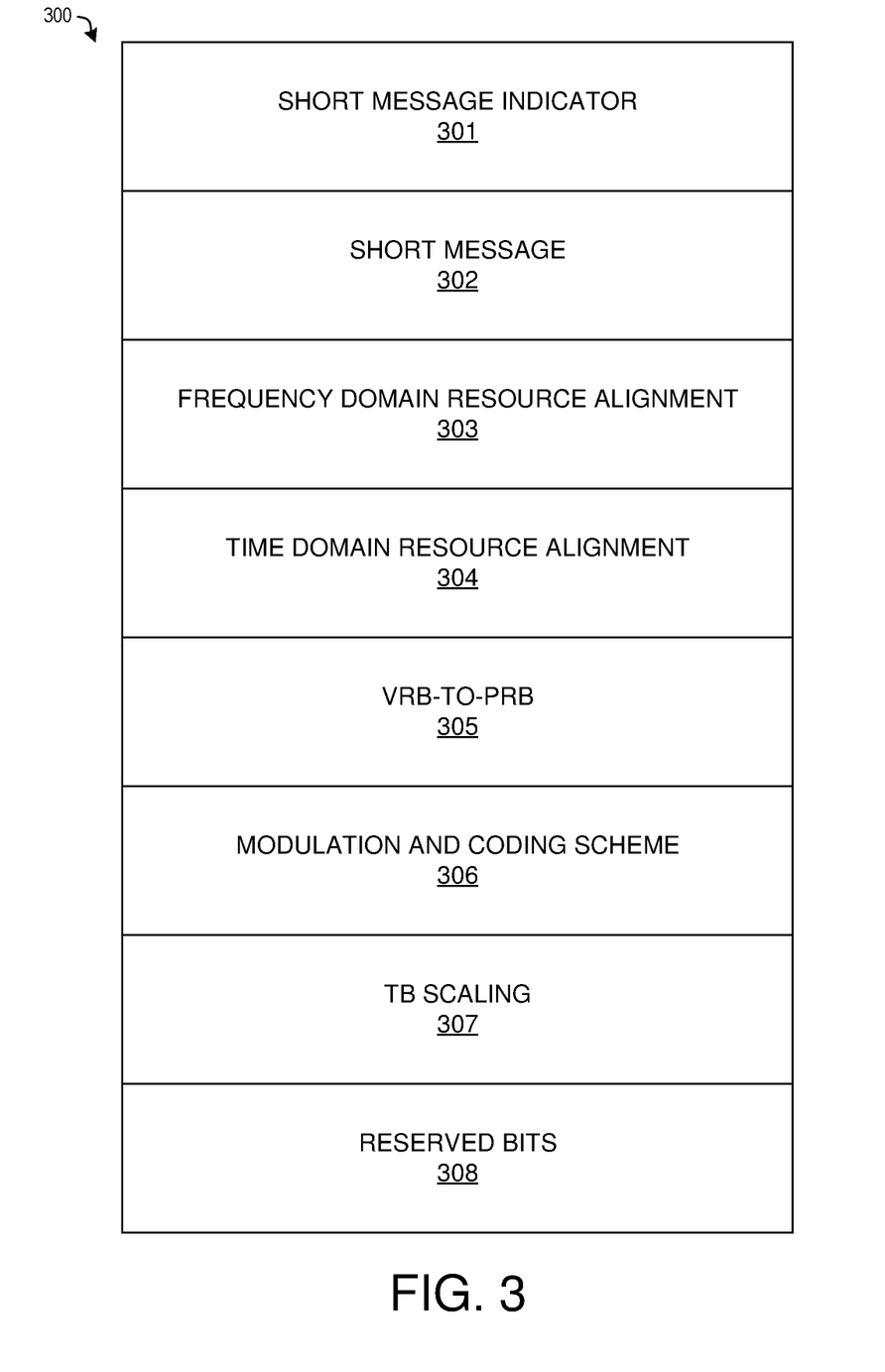
FIG. 3 illustrates one embodiment of format of PEI message including PEI in accordance with one novel aspect of the present invention.

FIG. 3 illustrates one embodiment of a format of a PEI message including a PEI in accordance with one novel aspect. In particular, a format of a PEI message 300 includes a DCI format 1_0. Accordingly, the PEI message 300 may include: a field 301 of short message indicator, a field 302 of short message, a field 303 of frequency domain resource alignment, a field 304 a time domain resource alignment, a field 305 of Virtual Resource Block (VRB) to Physical Resource Block (PRB) mapping, a field 306 of modulation and coding scheme, a field 307 of Transport Block (TB) scaling and a field 308 of reserved bits.

In one implementation, at least one of the fields 301 to 308 can be reused/repurposed as the PEI, i.e., at least one of the fields 301 to 308 can be configured as the PEI. Further, regarding the field 301 of short message indicator, a field of at least one unused bit of the field 301 of short message indicator can be reused/repurposed as the PEI, i.e., the field of the at least one unused bit of the field 301 of short message indicator can be configured as the PEI. Regarding the field 302 of short message, a bit of the field 302 of short message is used as system information (SI) update, a bit of the field 302 of short message is used as Earthquake and Tsunami Warning System (ETWS)/Commercial Mobile Alert System (CMAS) notification, and a field of at least one unused bit of the field 302 of short message can be reused/repurposed as the PEI, i.e., in addition to the bit used as SI update and the bit used as ETWS/CMAS notification, the field of at least one unused bit of the field 302 can be configured as the PEI.

In one implementation, when reference signal (RS) information is supported and multiple RS sets are broadcasted to the UE under idle mode, at least one of the fields 301 to 308 can be configured as an indicator for indicating availability of RS set(s). Further, regarding the field 301 of short message indicator, the field of at least one unused bit of the field 301 of short message indicator can be reused/repurposed as the indicator for indicating availability of RS set(s), i.e., the field of the at least one unused bit of the field 301 of short message indicator can be configured as the indicator for indicating availability of RS set(s). Regarding the field 302 of short message, the field of at least one unused bit of the field 302 of short message can be reused/repurposed as the indicator for indicating availability of RS set(s), i.e., the field of at least one unused bit of the field 302 can be configured as the indicator for indicating availability of RS set(s).

In this embodiment of the PEI message 300, the PEI message 300 may include a cyclic redundancy check (CRC) field (not shown in FIG. 3) scrambling by P-RNTI.

Figure 4A:
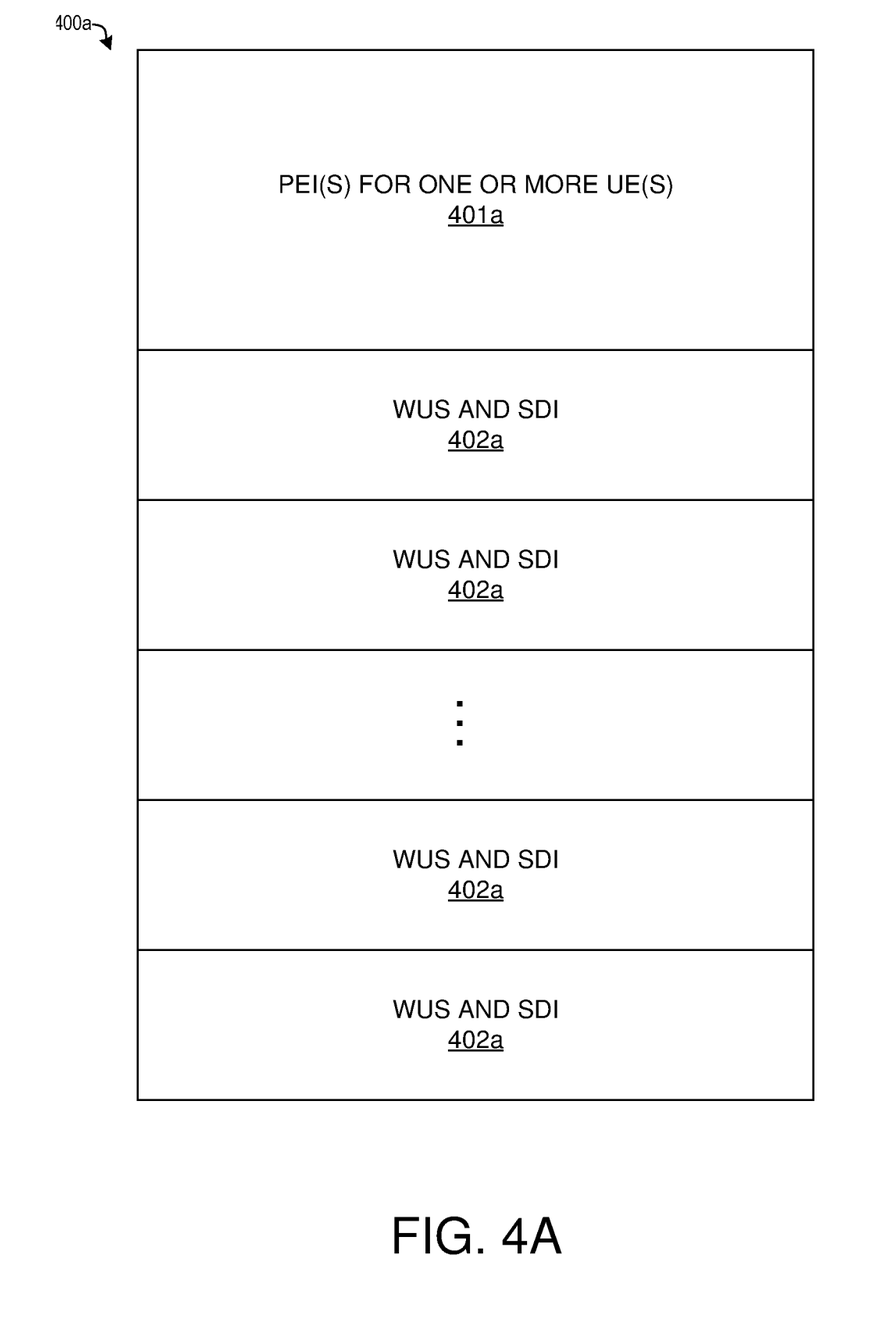
FIG. 4A illustrates one embodiment of format of PEI message including PEI in accordance with one novel aspect of the present invention.

FIG. 4A illustrates one embodiment of a format of a PEI message including PEI(s) in accordance with one novel aspect. In particular, a format of a PEI message 400a includes a DCI format 2_6. Accordingly, the PEI message 400a may include: at least one bit 401a configured as PEI(s) for one or more UE(s) under idle mode, and a plurality of fields 402a of wake-up signal(s) (WUS(s)) and SCell dormancy indication(s) (SDI(s)) for one or more UE(s) under connected mode.

For example, X bit(s) 401a can be configured as the PEI(s), and X can be configured by system information or be calculated according to the number of PO(s) and/or subgroups indicated by the corresponding PEI.

Figure 4B:
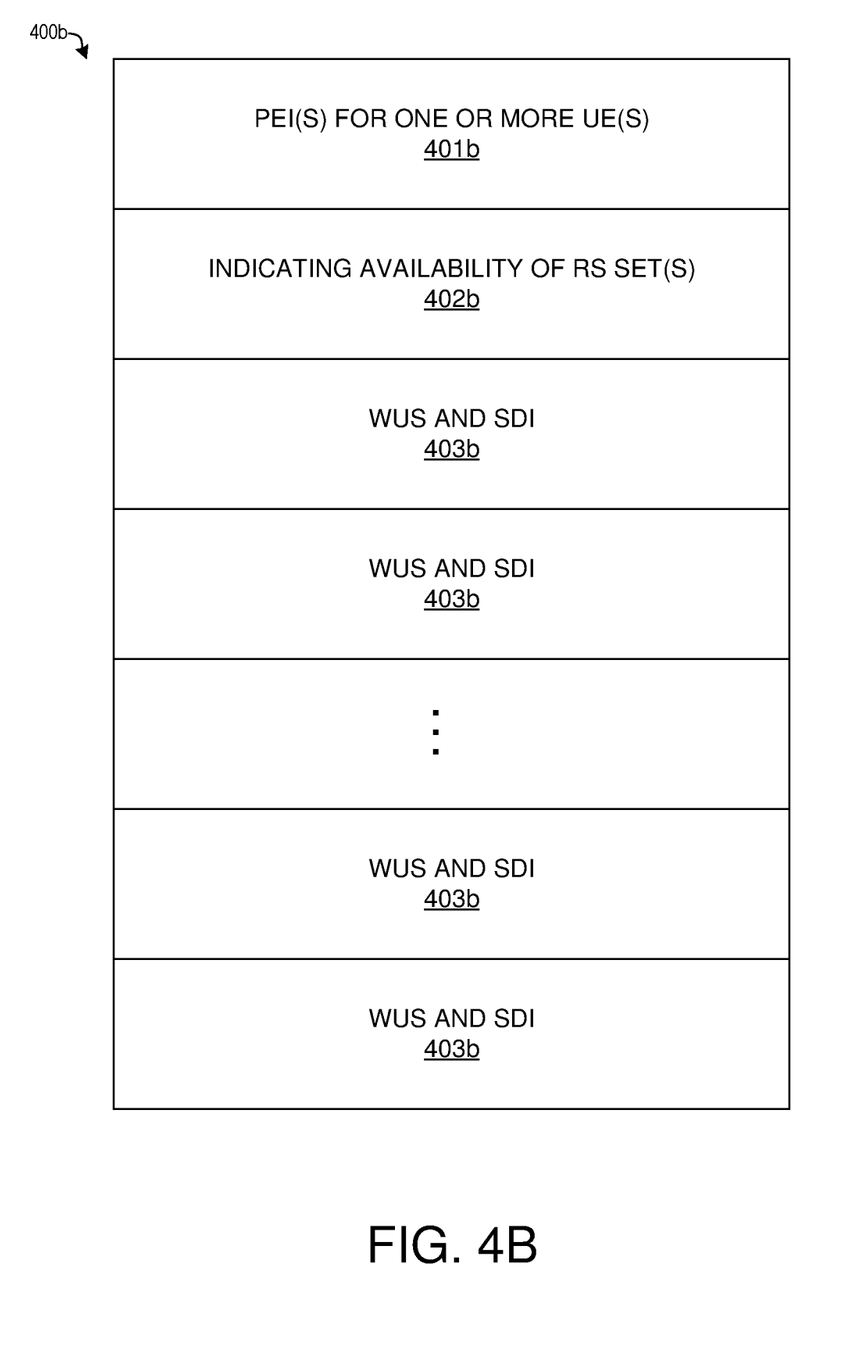
FIG. 4B illustrates one embodiment of format of PEI message including PEI in accordance with one novel aspect of the present invention.

FIG. 4B illustrates one embodiment of a format of a PEI message including PEI(s) in accordance with one novel aspect. In particular, a format of a PEI message 400b includes a DCI format 2_6. Accordingly, when RS information is supported and multiple RS sets are broadcasted to UE under idle mode, the PEI message 400b may include: at least one bit 401b configured as PEI(s) for one or more UE(s) under idle mode, at least one bit 402b of indicating availability of RS set(s), and a plurality of fields 403b of WUS(s) and SDI(s) for one or more UE(s) under connected mode.

For example, X bit(s) 401b can be configured as the PEI(s), and X can be configured by system information or be calculated according to the number of PO(s) and/or subgroups indicated by the corresponding PEI. Y bit(s) 402b can be used for indicating availability of RS set(s), and Y is $[\log_2 N]$ bits, where N is the number of RS set(s).

In these embodiments of the PEI messages 400a and 400b, a size of the PEI message 400a or 400b may be configured by system information or calculated according to the number of PO(s) and/or subgroups indicated by the PEI(s) included in the PEI message 400a or 400b. The PEI message 400a and 400b may respectively include a CRC field (not shown in FIGS. 4A and 4B) scrambling by P-RNTI or a dedicated new RNTI (e.g., reserved RNTI which are 65520-65533).

Figure 5A:
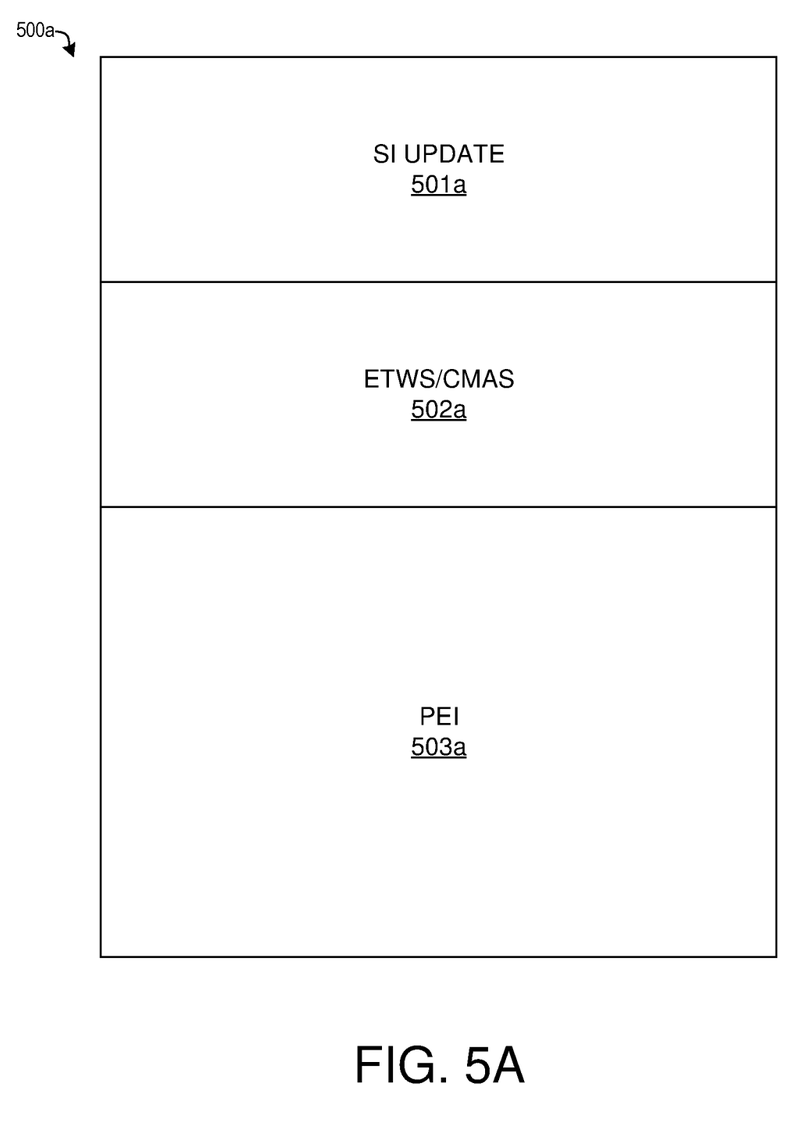
FIG. 5A illustrates one embodiment of format of PEI message including PEI in accordance with one novel aspect of the present invention.

FIG. 5A illustrates one embodiment of a format of a PEI message including PEI(s) in accordance with one novel aspect. In particular, a format of a PEI message 500a includes a new DCI format. Based on the new DCI format, the PEI message 500a may include: a bit 501a of SI update, a bit 502a of ETWS/CMAS notification, and at least one bit 503a configured as PEI(s).

For example, X bit(s) 503a can be configured as the PEI(s), and X can be configured by system information or be calculated according to the number of PO(s) and/or subgroups indicated by the corresponding PEI.

Figure 5B:
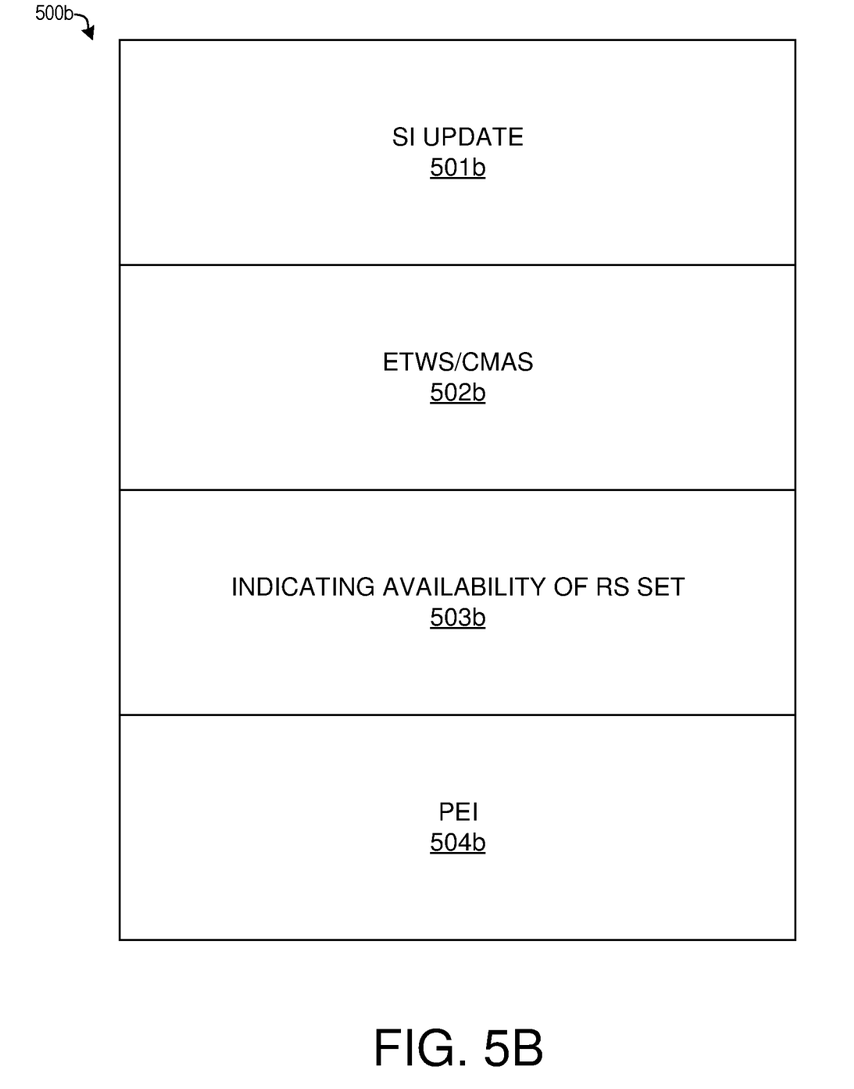
FIG. 5B illustrates one embodiment of format of PEI message including PEI in accordance with one novel aspect of the present invention.

FIG. 5B illustrates one embodiment of a format of a PEI message including PEI(s) in accordance with one novel aspect. In particular, a format of a PEI message 500b includes a new DCI format. Based on the new DCI format, when RS information is supported and multiple RS sets are broadcasted to UE under idle mode, the PEI message 500a includes: a bit 501b of SI update, a bit 502b of ETWS/CMAS notification, at least one bit 503b of indicating availability of RS set(s), and at least one bit 504b configured as PEI(s).

For example, X bit(s) 504b can be configured as the PEI, and X can be configured by system information or be calculated according to the number of PO(s) and/or subgroups indicated by this PEI. Y bit(s) 503b can be used for indicating availability of RS set(s), and Y is [log 2N] bits, where N is the number of RS set(s).

In these embodiments of the PEI message 500a and 500b, a size of the PEI message 500a or 500b may be configured by system information or calculated according to the number of PO(s) and/or subgroups indicated by the PEI(s) included in the PEI message 500a or 500b. The PEI messages 500a and 500b may respectively include a CRC field (not shown in FIGS. 5A and 5B) scrambling by P-RNTI or a dedicated new RNTI (e.g., reserved RNTI which are 65520-65533).

In one embodiment, based on the above DCI-based PEI, the PEI may be signaled via a PEI message having DCI format and transmitted in given search space (SS). In one implementation, the given SS for the PEI may include a paging SS. When an identification (e.g., searchSpaceId) of the paging SS is "0", UE monitors SS according to 3GPP Technical Specification (TS) 38.213. When an identification (e.g., searchSpaceId) of the paging SS is not "0", UE monitors SS according to 3GPP TS 38.213. In one implementation, the given SS for PEI may include a dedicated SS. When an identification (e.g., searchSpaceId) of the dedicated SS is "0", UE monitors SS according to 3GPP TS 38.213. When an identification (e.g., searchSpaceId) of the paging SS is not "0", UE monitors SS according to 3GPP TS 38.213. Further, the design of the dedicated SS may follow the rules of common search space set type 0A (i.e., Type0A-PDCCH), type 1 (i.e., Type1-PDCCH) or type 2 (i.e., Type2-PDCCH).

In one embodiment, based on a SS configuration of the above given SS for transmitting the PEI, a CORESET indicated in the SS configuration (i.e., the CORESET corresponding to the given SS) is used.

In one embodiment, according to multi-beam operations, the UE may assume that the same PEI message including the PEI is repeated in all transmission beams and thus the selection of the beam(s) for the reception of the PEI message including the PEI is up to UE implementation. An occasion for the PEI is a set of S consecutive PDCCH monitoring occasions, where S is the number of actual transmitted SSBs determined according to a parameter of ssb-PositionInBurst in system information block-1 (SIB1).

In other words, the BS may transmit the PEI message including PEI via all transmission beams associated with the UE. Then the UE assumes that the same PEI message including the PEI is repeated in all transmission beams and selects at least one of a plurality of transmission beams for receiving the PEI message.

Figure 6:
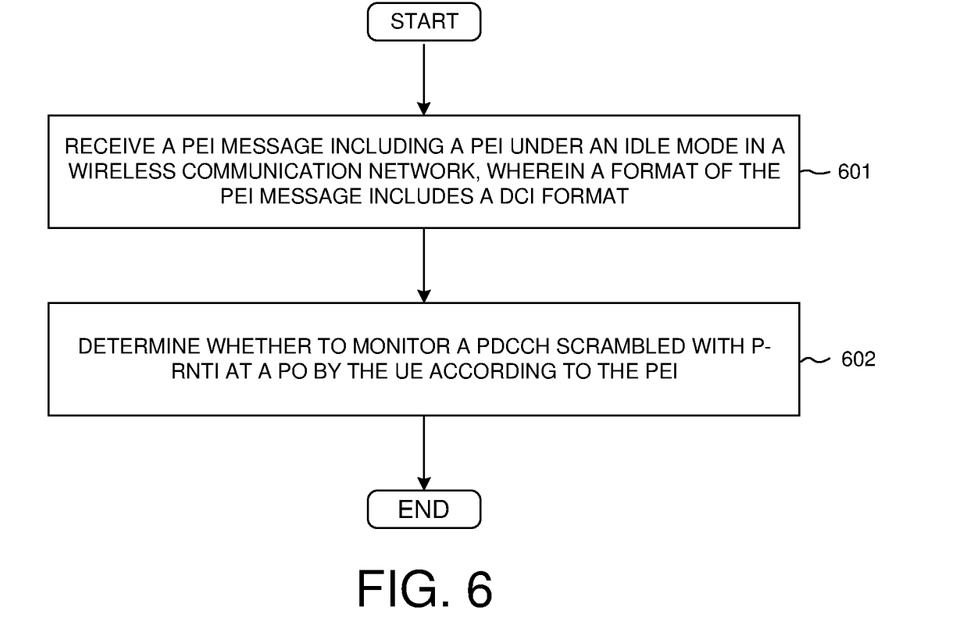
FIG. 6 is a flow chart of a method of utilizing DCI-based PEI for power consumption enhancements from UE perspective in a 5G/NR network in accordance with one novel aspect of the present invention.

FIG. 6 is a flow chart of a method of utilizing DCI-based PEI for power consumption enhancements from UE perspective in a 5G/NR network in accordance with one novel aspect. In step 601, a UE receives a PEI message under an idle mode in a wireless communication network. The PEI message includes a PEI and a format of the PEI message includes a DCI format. In step 602, the UE determines whether to monitor a PDCCH scrambled with P-RNTI at a PO according to the PEI.

In one embodiment, the DCI format of the PEI message includes a DCI format 1_0. Accordingly, the PEI message may include a short message indicator field, a short message field, a frequency domain resource alignment field, a time domain resource alignment field, a VRB-to-PRB mapping field, a modulation and coding scheme field, a TB scaling field and a reserved bits field.

In one implementation, at least one field of at least one unused bit of the short message indicator field, at least one unused bit of the short message field, the frequency domain resource alignment field, the time domain resource alignment field, the VRB-to-PRB mapping field, the modulation and coding scheme field, the TB scaling field and the reserved bits field is configured as the PEI.

In one implementation, when RS information is supported and multiple RS sets are broadcasted to UE under idle mode, at least one field of at least one unused bit of the short message indicator field, at least one unused bit of the short message field, the frequency domain resource alignment field, the time domain resource alignment field, the VRB-to-PRB mapping field, the modulation and coding scheme field, the TB scaling field and the reserved bits field is configured for indicating availability of RS set(s).

In one embodiment, the DCI format of the PEI message includes a DCI format 2_6. In one implementation, the PEI message may include at least one bit configured as the PEI(s) for one or more UEs, and a plurality of fields of WUS and SDI for one or more UEs. In one implementation, when RS information is supported and multiple RS sets are broadcasted to the UE under idle mode, the PEI message may include at least one bit configured as the PEI(s) for one or more UEs, at least one bit of indicating availability of RS set(s), and a plurality of fields of WUS and SDI for one or more UEs.

In one embodiment, the DCI format includes a new DCI format. In one implementation, the PEI message may include a bit of SI update, a bit of ETWS/CMAS notification, and at least one bit configured as PEI. In one implementation, the PEI message may include a bit of SI update, a bit of ETWS/CMAS notification, at least one bit of indicating availability of RS set and at least one bit configured as PEI.

Figure 7:
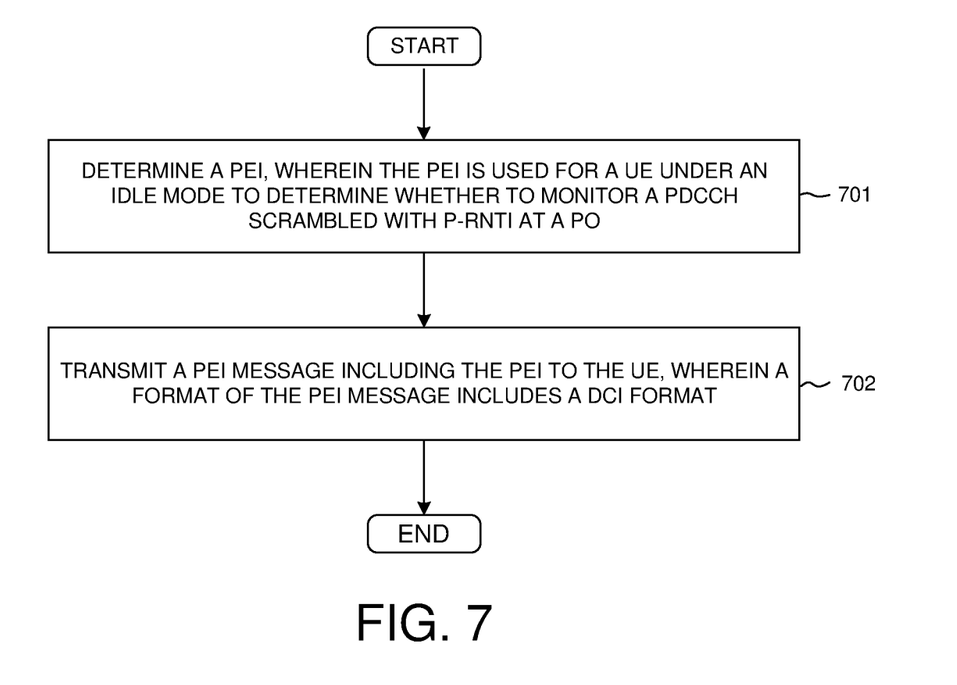
FIG. 7 is a flow chart of a method of utilizing DCI-based PEI for power consumption enhancements from network perspective in a 5G/NR network in accordance with one novel aspect of the present invention.

FIG. 7 is a flow chart of a method of utilizing DCI-based PEI for power consumption enhancements from network perspective in a 5G/NR network in accordance with one novel aspect. In step 701, a BS determines a PEI. The PEI is used for a UE under an idle mode to determine whether to monitor a PDCCH scrambled with P-RNTI at a PO. In step 702, the BS transmits a PEI message including the PEI to the UE. A format of the PEI message includes a DCI format.

In one embodiment, the DCI format of the PEI message includes a DCI format 1_0. Accordingly, the PEI message may include a short message indicator field, a short message field, a frequency domain resource alignment field, a time domain resource alignment field, a VRB-to-PRB mapping field, a modulation and coding scheme field, a TB scaling field and a reserved bits field.

In one implementation, at least one field of at least one unused bit of the short message indicator field, at least one unused bit of the short message field, the frequency domain resource alignment field, the time domain resource alignment field, the VRB-to-PRB mapping field, the modulation and coding scheme field, the TB scaling field and the reserved bits field is configured as the PEI.

In one implementation, when RS information is supported and multiple RS sets are broadcasted to UE under idle mode, at least one field of at least one unused bit of the short message indicator field, at least one unused bit of the short message field, the frequency domain resource alignment field, the time domain resource alignment field, the VRB-to-PRB mapping field, the modulation and coding scheme field, the TB scaling field and the reserved bits field is configured for indicating availability of RS set(s).

In one embodiment, the DCI format of the PEI message includes a DCI format 2_6. In one implementation, the PEI message may include at least one bit configured as the PEI(s) for one or more UEs, and a plurality of fields of WUS and SDI for one or more UEs. In one implementation, when RS information is supported and multiple RS sets are broadcasted to the UE under idle mode, the message may include at least one bit configured as the PEI(s) for one or more UEs, at least one bit of indicating availability of RS set(s), and a plurality of fields of WUS and SDI for one or more UEs.

In one embodiment, the DCI format of the PEI message includes a new DCI format. In one implementation, the PEI message may include a bit of SI update, a bit of ETWS/CMAS notification, and at least one bit configured as PEI. In one implementation, the message may include a bit of SI update, a bit of ETWS/CMAS notification, at least one bit of indicating availability of RS set and at least one bit configured as PEI.

Although the present invention is described above in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
receiving a Paging Early Indicator (PEI) message including a PEI under an idle mode by a User Equipment (UE) in a wireless communication network, wherein a format of the PEI message includes a Downlink Control Information (DCI) format, and wherein the DCI format of the PEI message is a new DCI format and at least one bit of the PEI message is configured as the PEI; and
determining whether to monitor a Physical Downlink Control Channel (PDCCH) scrambled with Paging-Radio Network Temporary Identifier (P-RNTI) at a Paging Occasion (PO) by the UE according to the PEI.

2. The method of claim 1, wherein the PEI message further includes a bit of system information update and a bit of Earthquake and Tsunami Warning System (ETWS) or Commercial Mobile Alert System (CMAS) notification.

3. The method of claim 1, wherein the PEI message further includes at least one bit of indicating availability of Reference Signal (RS) set.

4. The method of claim 1, wherein the PEI message including the PEI is received based on a search space and a Control Resource Set (CORESET) corresponding to the search space, and the search space includes a paging search space or a dedicated search space.

5. The method of claim 1, wherein the PEI message including the PEI is received via at least one of a plurality of transmission beams when the PEI message including the PEI is transmitted via each of the plurality of transmission beams.

6. A User Equipment (UE), comprising:
a receiver that receives a Paging Early Indicator (PEI) message including a PEI under an idle mode, wherein a format of the PEI message includes a Downlink Control Information (DCI) format, and wherein the DCI format of the PEI message is a new DCI format and at least one bit of the PEI message is configured as the PEI; and
a paging and PEI handling circuit that determines whether to monitor a Physical Downlink Control Channel (PDCCH) scrambled with Paging-Radio Network Temporary Identifier (P-RNTI) at a Paging Occasion (PO) according to the PEI.

7. The UE of claim 6, wherein the PEI message further includes a bit of system information update, a bit of Earthquake and Tsunami Warning System (ETWS) or Commercial Mobile Alert System (CMAS) notification.

8. The UE of claim 6, wherein the PEI message further includes at least one bit of indicating availability of Reference Signal (RS) set.

9. The UE of claim 6, wherein the PEI message including the PEI is received based on a search space and a CORESET corresponding to the search space, and the search space includes a paging search space corresponding to the PO or a dedicated search space.

10. The UE of claim 6, wherein the PEI message including the PEI is received via at least one of a plurality of transmission beams when the PEI message including the PEI is transmitted via each of the plurality of transmission beams.

11. A method, comprising:
determining a Paging Early Indicator (PEI) by a Base Station (BS), wherein the PEI is used for a User Equipment (UE) under an idle mode to determine whether to monitor a Physical Downlink Control Channel (PDCCH) scrambled with Paging-Radio Network Temporary Identifier (P-RNTI) at a Paging Occasion (PO); and
transmitting a PEI message including the PEI to the UE by the BS, wherein a format of the message includes a Downlink Control Information (DCI) format, wherein the DCI format of the PEI message is a new DCI format and at least one bit of the PEI message is configured as the PEI.

* * * * *